United States Patent

[11] 3,568,953

| [72] | Inventor | Dale L. Beezley |
| | | P.O. Box 41, Los Altos, Calif. 94022 |
| [21] | Appl. No. | 810,702 |
| [22] | Filed | Mar. 26, 1969 |
| [45] | Patented | Mar. 9, 1971 |

[54] AIRCRAFT AND JET TAKEOFF AND LANDING SYSTEM
2 Claims, 2 Drawing Figs.

[52] U.S. Cl. .................................................. 244/2
[51] Int. Cl. ............................................. B64c 37/02, B64d 5/00
[50] Field of Search ........................................ 244/2, 3, 1, 6, 110, 139, 114, 115

[56] References Cited
UNITED STATES PATENTS

| 2,471,599 | 5/1949 | Young | 244/2(X) |
| 2,843,337 | 7/1958 | Bennett | 244/2 |
| 3,070,326 | 12/1962 | Griffith | 244/2 |

FOREIGN PATENTS

| 432,145 | 3/1948 | Italy | 244/3 |

Primary Examiner—Milton Buchler
Assistant Examiner—Carl A. Rutledge

ABSTRACT: An aircraft takeoff and landing system capable of nearly vertical takeoff and landing of any conventional aircraft by the use of an assist craft having rotary wing vertical takeoff and landing capability with rearwardly directed fans capable of providing lift to said conventional craft positioned closely behind said assist craft.

PATENTED MAR 9 1971
3,568,953
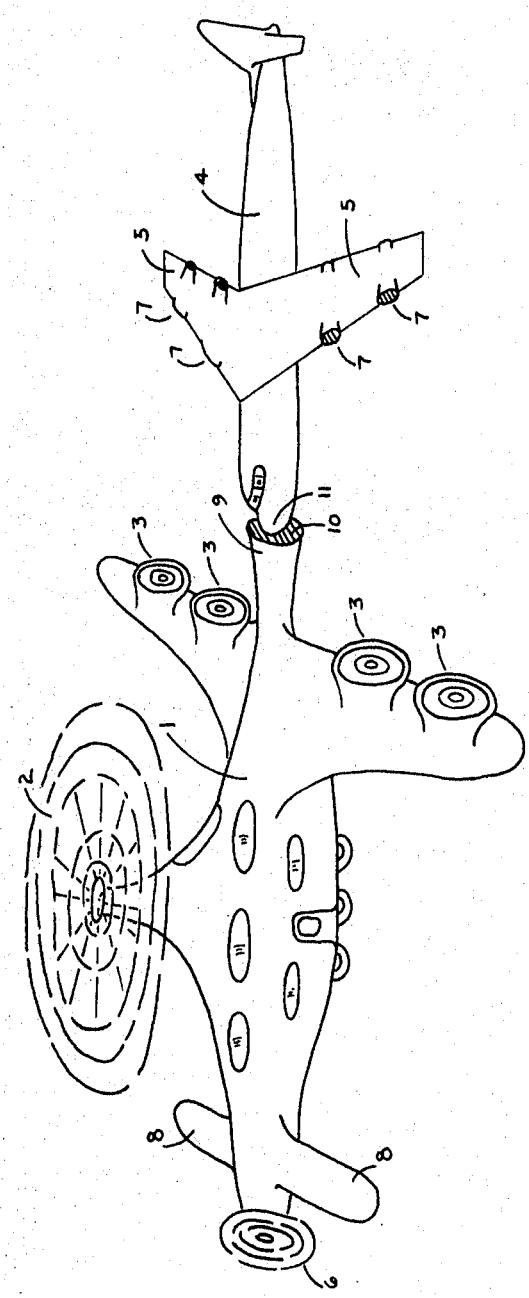
INVENTOR
D.L. BEEZLEY
D.L. Beezley

AIRCRAFT AND JET TAKEOFF AND LANDING SYSTEM

This invention relates to the landing and taking off of aircraft at airports where the physical limitations of geological formations and urban expansion limit the size of landing strips to lengths considerably shorter than safety permits.

Prior art in this situation has attempted to solve the problem by endowing aircraft with vertical or near-vertical takeoff and landing capabilities. Such efforts have resulted in auxiliary rotary wings, tiltable propellors, rocket-assist devices, and reverse-thrust devices such as rockets or passive braking such as parachutes. All of these contrivances add tremendous weight and performance penalties to the aircraft or jet structures, thus sacrificing economy and long-range performance for short takeoff and landing performance.

The present invention removes this penalty from high-performance aircraft by placing the takeoff and landing devices separate and completely apart from the physical aircraft, causing no modification whatsoever to existing aircraft and jet plane airfoil and structure designs. The method whereby this is accomplished is to provide another assisting aircraft capable of vertical or near-vertical takeoff and landing and possessing large fans capable of delivering high wind velocities to the rear, in such a manner that a conventional aircraft taking off or landing may do so by following close behind the assisting aircraft and receiving the lift-producing wind from the assist craft's fans.

These and other features and advantages of the present invention will become readily apparent from the following detailed description of a single embodiment thereof, particularly when taken in connection with the accompanying drawing wherein like reference numerals refer to like parts and wherein the FIGURE is a representation of the system with a single embodiment of the assist aircraft.

Referring to the drawing in more detail, it is seen that in a typical assist aircraft 1, a vertical takeoff capability is provided by a rotary wing 2 while a set of fans 3 mounted on the back of said assist aircraft provide a rearwardly directed airstream. To counter the tendency of said fans to propel the assist craft 1 forward at an undesired forward rate of speed, which would take up too much runway, a reversing prop 6 turns in a direction to tend to cancel the forward thrust on said assist aircraft, leaving the upward thrust of rotary wing 2 to dominate the takeoff phase of said assist aircraft. The conventional aircraft 4, which may be either prop-driven or jet-driven, is positioned, on takeoff, directly behind assist craft 1, with the nose 11 entering the spacing boom 9 and partially compressing a compressible plastic material 10 inside the open end of said boom. As assist craft 1 increases the rotary velocity of its fans 3, producing increasing velocity rearwardly directed wind over the wings 5 of conventional craft 4, said conventional craft increases the thrust of its engines 7 to maintain the same position with respect to the spacing boom 9. At some critical wind velocity from fans 3, the lift produced on wings 5 is sufficient to begin lifting craft 4 off the ground. When this begins to happen, rotary wing 2 of craft 1 is rotated faster to raise craft 1 off the ground. The wing and tail surface controls of craft 4 are varied, automatically or in response to pilot manipulations, to cause craft 4, now airborne, to follow craft 1 upward or skyward. When sufficient height above the landing field is achieved, from considerations of safety and visibility, the reverse thrust of prop 6 is reduced to allow craft 1 to travel horizontally to the ground. Craft 4 responds with increased thrust of engines 7 to stay within the influence of the lift-producing wind created by fans 3, by maintaining the nose 11 inside boom 9. Craft 1 continues to increase its ground speed until such time that craft 4 is travelling with sufficient velocity to maintain altitude without the influence of fans 3. At this time the assist craft 1 rises vertically out of the path of craft 4, which conventional craft is then independently airborne.

The landing procedure is just the reverse of the takeoff procedure, with the assist craft 1 rendezvousing with the craft 4 at some safe altitude and conducting said craft all the way to the ground for a near-vertical landing maneuver, it only being required that craft 4 maintain the proper nose-in-boom position behind the assist craft at all times.

Now it is clear that new flying skills must be developed for a system just described; for this reason, and because inherent instability could lurk in a pilot-controlled system, it is highly desirable to allow an automatic system to make the control corrections necessary to maintain craft 4 at all times in the correct nose-to-boom relationship to the assist craft. That is, during takeoff and landing procedures, the pilot of the assist craft 1 has complete and independent control over the forward and vertical motion of his craft; whereas a closed loop automatic control would slave the motion of craft 4 to the motion of craft 1. This may be achieved by a direct sliding electrical contact within the boom that would sense any discrepancies between the relative motions of craft 1 and craft 4, and would correct said discrepancies by control over craft 1 through a conventional autopilot installed in craft 1. Such modifications would require changes to the electrical system of the conventional craft, so that it must be stressed that the skilled pilot control of this landing system is the preferred embodiment.

The invention may be embodied in other specific forms without changing the essential characteristics, so that it must be understood that the foregoing description was merely illustrative and in no way restrict the scope of the invention as indicated by the appended claims.

I claim:

1. An assist craft arrangement whereby any conventional craft having lifting surfaces may take off and land by being positioned behind said assist craft within the influence of a lift-producing wind created by large fans on said assist craft, said assist craft having a rotary wing to take off and land vertically or near-vertically, said fans producing a rearwardly directed wind for purposes of creating lift on said conventional aircraft, and said assist craft having reverse thrust means to nullify the thrust created by said rearwardly directed fans.

2. An assist craft according to claim 1 having a restraining rearwardly projecting boom to prevent the conventional craft from approaching too close to the fans of said assist craft.